Aug. 17, 1926.  1,596,482
J. M. EWEN
METHOD OF PRODUCING CEMENT TILES, SLABS, AND LIKE PRODUCTS
Filed Feb. 6, 1924
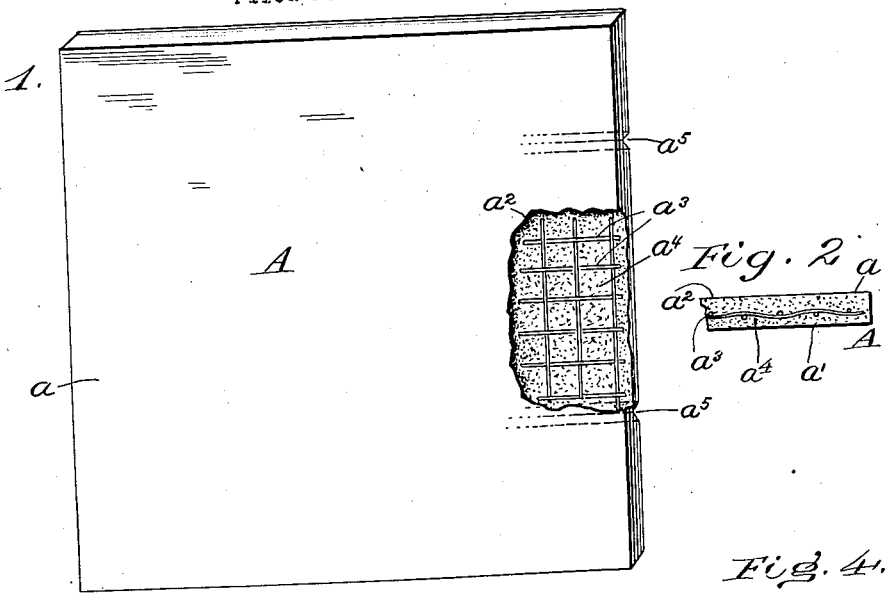
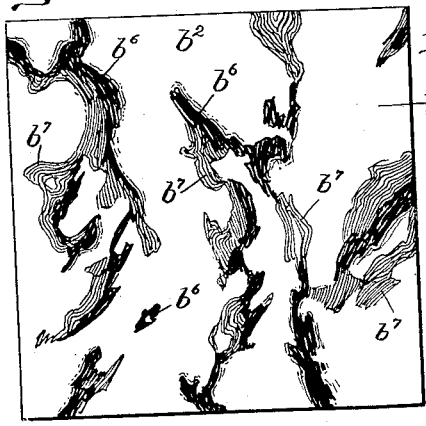
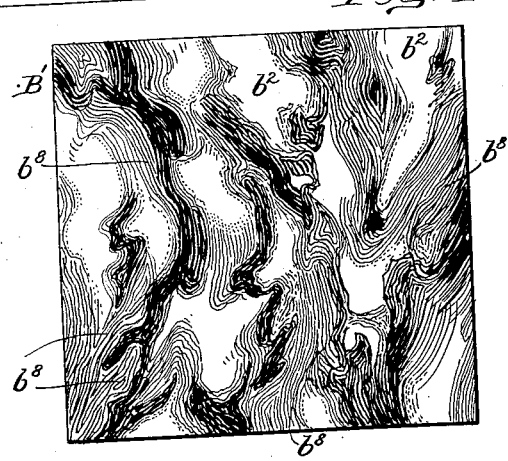
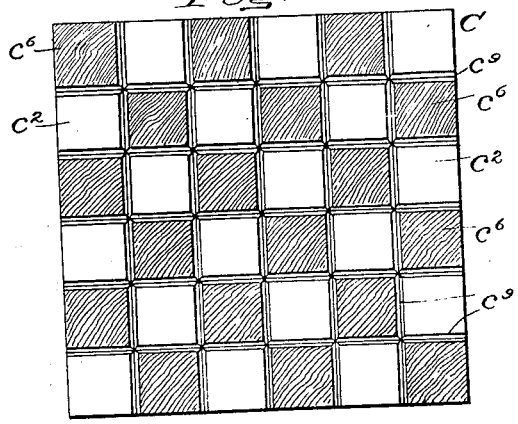
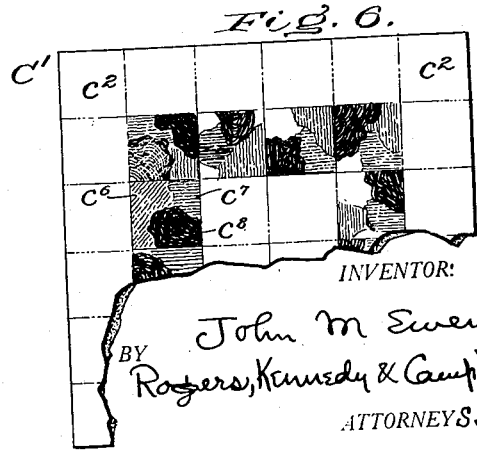
INVENTOR:
John M. Ewen,
BY Rogers, Kennedy & Campbell
ATTORNEYS.

Patented Aug. 17, 1926.

1,596,482

UNITED STATES PATENT OFFICE.

JOHN MEIGGS EWEN, OF NEW YORK, N. Y.

METHOD OF PRODUCING CEMENT TILES, SLABS, AND LIKE PRODUCTS.

Application filed February 6, 1924. Serial No. 690,971.

This invention relates to the method of producing cement tiles, slabs and like products. The products include various articles such as panels, art pieces, molding and interior trim as well as various specific objects such as garden boxes, benches and an endless variety of manufactures. The invention is available for plain products or tiles or on the other hand various ornamental effects such as marbled effects and other irregular designs, mosaic effects, including tesserae or other designs, the effect of the so-called Spanish tile, and various art effects, comprising birds, flowers, monograms or other figures.

The main purpose of the present invention is to afford such products which may be more rapidly, cheaply and easily produced than heretofore and yet possess superior qualities of appearance, strength, hardness, durability, waterproofness, etc. The present invention combines the good qualities and attractiveness of heretofore known high priced products, while making them available at the low prices of goods of ordinary or inferior qualities. Other and particular objects and advantages of the present invention will be explained in the hereinafter following description or will be apparent to those skilled in the art.

To the accomplishment of such objects and advantages the present invention consists in the method of producing novel tiles, slabs and like products as herein described.

First will be described the use of the invention in the production of plain white or colored tile, for example, of size of 4" square, useful for floors and walls or for various other purposes such as mantels, roofs, etc.

The raw materials may vary in quality and proportions and may be, for example, as follows. One part of cement, such as Portland cement, is to be mixed with two parts of rock ingredient, such as sand, marble dust or granite screenings. The proportions mentioned may be varied, but are satisfactory, and will result in a durable tile with a hard finish such as is required in first class work. The ingredients, including the cement, should be first sifted through a screen of at least 600 meshes to the square inch, not only to eliminate coarse material, accidentally present, but to avoid introducing into the product any portions of the ingredients that may have become hard from exposure and will not readily break up in the subsequent forming of the mortar, but will tend to show on the surface as of a slightly different color. The sifted materials should be thoroughly mixed in a dry condition in a mechanical mixing apparatus until in a uniform and homogeneous condition.

Hydration may next be brought about by the addition of water, which is preferably added to a considerable excess, the mortar being thinned down until more or less of the consistency of thick pea soup, or semifluid. Preferably the water has combined with it about 15% of any well known hardener, tending to improve and quicken the process. Suitable coloring material may be added with the water or in the mixer if a colored product is desired.

The molding of the articles is then preferably performed by pouring the mortar carefully upon a highly polished non-corrosive surface such as plate glass, held level. It is desirable that the mortar at this time shall contain little or no gases or air. The mortar should be carefully poured at one point upon the glass, namely, at the center, so that it may spread and flow therefrom in all directions, giving an action tending to squeegee the air from between the mortar and the glass. Around the edges of the plate glass bottom, and confining the mortar, is preferably a frame or chase constructed of steel. For example, this may be rectangular with interior dimensions 2 feet by 3 feet, the plate glass being slightly larger in all directions. Before the molding the plate glass is preferably well greased with oil and turpentine so that when the mortar sets it will not adhere to the glass.

If an ornamental product is desired certain steps are to be taken at this point, as will be separately later described, this description being confined to the manufacture of a plain tile, colored or uncolored.

The excess moisture is next absorbed or taken up partially by means of an agent which is herein termed an antidote. Having originally included an excess of water the antidote absorbs this and counteracts the excess. This system avoids the initial calculation of the exact quantity of water required for hydration. The antidote is to be spread in the mold, and may consist of Portland cement combined with a small percentage of barytes and talcum. The effect of this dry agent spread upon the mortar is to absorb not only the loose water but all contained water which the cement will give up in hydrating. Preferably the antidote is insufficient in quantity to absorb the entire amount of moisture, but is such as to leave it sufficiently damp so that it may subsequently hydrate a small additional quantity of antidote.

It is important to measure accurately the quantity of antidote to be applied, and to apply it evenly over the mold. For this purpose a container may be employed, adapted to extend over the entire area of the mold having two horizontal slides, arranged closely together, to enclose between them the correct quantity. The upper slide may be pulled out and antidote poured into the container, resting upon the bottom slide. The upper slide may then be pushed in, cutting off the requisite amount of material, the container may now be held directly over the mold and the lower slide pulled out. The uniform and correct amount of material is thereby discharged evenly over the surface of the mold. The quantity may be adjusted by varying the space between the slides.

The mortar at this stage is approximately of the consistency of cheese, and in readiness to be cut or molded for the purpose of producing the desired tiles or other articles, of the desired shape and size. The product should be free from bubbles of gas or air and if any exist they may be pressed out at this stage by applying pressure in the amount of from 1 to 5 tons, more or less.

The cutting of the material into the desired shapes may then be performed by means of a grid consisting of blades or strips with sharpened edges. In the case of square tiles these consist simply of straight edges intersecting at numerous points. This cutter or grid is to be lowered upon the tile, being guided downwardly by the sides and corners of the chase, and forced through the mortar until the edges of the blades rest upon the glass. This cuts the material into the desired tiles or pieces and holds them firmly in place. The cutter is at least as deep as the final thickness of the tiles and preferably is of the same depth. It may be greased to prevent adhesion of mortar.

For most uses the tiles should be reinforced and this is preferably done at this stage of the process. Wire mesh with quarter inch meshes or expanded metal or the like may be used. Preferably separate reinforcements for the separate tiles are previously prepared and one inserted in each space in the cutter or grid and pressed upon the damp surface of the mortar. Reinforcing may be omitted for some uses, but it is of great advantage. It enables a strong tile to be made of minimum thickness, as small as one-quarter inch. It reduces breakage in transportation, a large factor. It minimizes injury and facilitates repair, for the cracks produced by strains after being set in the building, which are likely to occur in a new building, will not extend irregularly across the face of the material, but will be confined along the joints or grooves, requiring only filling in by new mortar to restore perfect appearance.

The backing of the tile may next be effected by adding a supplemental layer of antidote or moisture absorbing agent, which may be spread in any manner, for example, as before stated. Pressure is then applied by means of a backing plate or tool, of such weight that its own pressure sufficiently forces the final material into place. The surface of the backing tool may be such as to impress or imprint upon the back of each tile such grooves as are desired, for the purpose of giving the tile a firm hold upon its bedding, when finally set into position, and the name of the maker, etc. The backing tool should be greased to prevent adherence to the tile.

The entire process to this point may have occupied only a matter of three or four minutes. The tiles are now in readiness to be removed from the glass plate for further treatment, making the plate available for further operation.

The setting and hardening operations are preferably performed with the tiles supported upon a system of lears or trays, these having smooth metal surfaces well greased before the reception of the tiles. The chase, the grid and the tiles are slid over the surface of the supporting glass and on to the surface of the lear. This sliding action adds materially to the perfection of the product, smoothing and compacting the face of the tiles. The chase and the grid are now to be removed, leaving the tiles upon the lear, slightly separated. The chase may be arranged to come apart. Each lear preferably is larger than the area covered by the tiles and has downward projections or legs at the corners. In this way one lear may be laid upon another without disturbing the tiles. A stack of lears may thus be built up, for example, upon a movable truck or support. A truck holding 50 lears, each containing 2 x 3 feet of tile, will thus support 300 sq. feet of tile.

After eight or ten hours the material will have set sufficiently to permit the next treatment. This preferably consists in steam-hardening the tiles. The stack of lears is transferred into a small room or oven which may be constructed of sheet iron and in which the tiles are subjected to the action of steam for at least 48 hours. This materially quickens and improves the hardening action.

A drying operation is now preferable, the tiles being subjected to a draft of hot air, in a similar metal chamber or oven, for a sufficient length of time to expel the excess water from the pores of the tiles.

Water or weather proofing of the tiles is usually desirable, and this may now be performed by passing them, while still hot and dry, through a tank of boiling paraffin. This thoroughly impregnates the material and protects the tiles from humidity and atmospheric impairment.

An improved surfacing may be effected, in lieu of the paraffin treatment, by spreading the tiles out and covering them, for example by a brushing operation, with a solution of sodium silicate or water glass. After a short treatment the tiles may be dipped into cold water. This removes the caustic soda and leaves silica in its colloidal form filling the pores of the surfaces of the tiles, giving a hard glassy surface, which is an additional protection against disintegration, etc.

The tiles should now be allowed to age for two weeks or so before actual use.

When variegated, marbled or streaked tiles are desired the described process may be modified as follows.

Receptacles should be maintained for mortars of the desired colors. After the first mortar has been poured upon the mold surface, with a few minutes of setting allowed, this is scraped or scratched by a suitable tool, which may be blunt, or like a fork. This removes the mortar from the glass surface in streaks, or irregular lines or patches as desired, leaving the glass bare. Another mortar, of different color, is poured into the depressions and shows at the bottom surface. A third color can be used after further forking operations, if three colors are desired, and so on.

The progress and effects of this operation can be readily followed because of the transparency of the plate glass support. Preferably the underside is illuminated, and mirrors are placed to give a full view of the surface being formed.

The definite outlines of the scratchings and marks may be undesirable, as indefinite demarkations may be more like natural marbles, or more artistic. Such change can now be effected by causing more or less blending of the mortars, by vibration. Various modes of vibrating the support may be used, such as fast rotating shafts mounted on the support and carrying unbalanced weights. One minute of vertical vibration may be enough to give satisfactory blending and diffusion of colors, softening the outlines. Too long an operation may cause a uniform monocolor blending.

When mosaic or tesseræ effects are desired the process as heretofore described may be modified as follows, to produce various geometrical or art designs, checkers, circles, hexagons, diamonds, birds, flowers and various irregular shapes. Heretofore mosaic tiles have usually been made of sawed pieces of marble, expensive in cost and difficult to lay, or of ceramic ware, equally expensive.

With this invention, after forming the first mortar, plain or with marbled effects, and applying the antidote or water absorber, the material may be treated as follows. A grid is pressed into the mortar having the desired design, for example, with square cells, forming a checkered mosaic or tesseræ. This grid may be a metal ribbon about $\frac{1}{16}$ to $\frac{1}{8}$ inch thick.

The mold and mortar are slid from the glass plate and held in position above a second support, glass plate or mold. While so held an ejecting tool forces alternate squares down, depositing them selectively on the second plate. This grid is then passed to a third plate and the remaining squares there ejected. The grid is then returned to the first plate and filled with mortar of the second color. It is slid off and held over the second plate while those squares are ejected which were not ejected on the previous operation, filling the vacant spaces on the second plate or mold. The grid then shifts to the third plate and the remaining squares are ejected, completing the pattern in the third mold. By proper ejecting tools, three or more colors can be selectively used, and the system is applicable also to hexagons and more ornamental shapes. The grids may have rough sides, like coarse sand paper, to enable them to carry the squares or pattern elements safely. The grids and ejectors may be mounted or guided to insure accurate positioning.

Having laid the mortar squares in the desired tesseræ pattern the process may continue as first described. The cutting grids can be applied, for example dividing the layer into 24 tiles each 6x6 inch, each consisting of 36 squares 1x1 inch. Reinforcing, backing, hardening, water-proofing, etc. may be as before.

The completed tiles will be found to have face grooves of fair depth, due to the spaces between the individual squares equal to the thickness of the metal strips of the grid design. These grooves correspond in width to the spaces left between tiles when set up in the building, and may be utilized to carry out the effect of individual stones by filling them with plain cement. This may be done after the tiles have been in place several days, by flooding the surface with liquid mortar, and after an hour or so scraping with a rubber scraper, leaving the grooves and the spaces between the tiles filled, and no joints appearing.

The product of this invention, the tile, slab or other article, by whichever of the processes produced, is considered to be substantially novel in a number of advantageous respects. It may be very light in weight, as low as three pounds to the square foot, less than half the weight of any other known cement tile. It may be less than ½" thick and as thin as ¼". Heretofore known cement tiles have been not less than ¾ to 1" in thickness. Tiles made by this invention may be laid over the floors of old buildings, due to their thinness. The metallic reinforcement makes this possible, the reinforcement being so combined with the other components as to give a strong, durable tile. Its described water and weather proof qualities are highly valuable and it is not known that any prior cement tile has possessed these qualities. The saving in cost of production is substantial. Allowing 10¢ per square foot to manufacture and 30¢ for laying the tile of this invention makes a total cost of 40¢. The cheapest known form of tile, namely, terrazzo, costs about 80¢ per square foot, laid, while marble slabs cost $1.25 and marble mosaic $1.75. With a building 60 x 100 feet, 20 stories high, a saving of over $20,000. is possible for tiling, to say nothing of a dead load saving of 5 or 6 pounds per square foot of floor area. The surface of the product of the present invention is of fine quality, owing to the use of plate glass mold bottoms and the steps of waterproofing and surfacing as described. The feature of unfilled grooves between the mosaic elements of tesseræ, produced by this invention, constitute a valuable feature, as explained, and not present in any other known tile. The hardness of the tile due to steam treatment is an advantageous quality. The described blended effects of variegated tile are new and attractive, and not available in any heretofore known tile.

In the accompanying drawings showing certain embodiments of the product hereof, in the form of tiles, Fig. 1 is a perspective view of a plain tile embodying the present invention and resulting from the practice of the described process.

Fig. 2 is a partial cross section of the tile shown in Fig. 1, the structure indicated referring also to the tiles of the other figures.

Fig. 3 is a face view of another tile embodying this invention presenting a different appearance, namely, with variegated or marbled effect.

Fig. 4 shows another tile with a design which is derived from that in Fig. 3.

Fig. 5 shows another tile bearing a mosaic or tesseræ effect, and

Fig. 6 shows a different mosaic or tesseræ effect.

In Figs. 1 and 2 the tile A may be produced by the first described process. Its front surface $a$ is a finished surface as described, while its rear surface $a'$ may be unfinished. The initial layer of mortar $a^2$ is shown at one side of the reinforcement or wire mesh $a^3$, while the backing or coarse material $a^4$ is at the other side. The entire article may be thin as shown and the better quality of cement $a^2$ may be of twice the thickness of the other. The rear surface may be grooved at $a^5$ for the purposes already described.

In Fig. 3 the tile B may be produced by the second described method, including the scratching or scraping operations, but omitting the blending or vibrating operations. The face or front surface $b$ is shown as comprising mainly the first or fine quality of mortar $b^2$ in which are inserted portions of mortar of different colors $b^6$ and $b^7$ produced by scraping the clean mortar at the rear and pouring in mortar $b^6$, then scraping further and pouring in mortar $b^7$. The design in this product has sharp outlines and may be considered less artistic than the product of Fig. 4.

The tile B' of Fig. 4 is simply the tile B of Fig. 3, but wherein the described blending operation is performed while the mortar is soft. Jolting or vibration causes the several mortars to spread and blend. The design indicated in Fig. 3 evolves gradually and the evolution may be stopped at any stage for example with the marbled effect of Fig. 4.

Fig. 5 shows a tile C having mosaic or tesseræ effects produced as already described. A number of the squares are of the color of the first mortar $c^2$, while others are of a different mortar $c^6$, for example in a checkered or tesseræ pattern as shown. The face grooves between the units of design, already referred to, are indicated by the grooves $c^9$ on this figure.

Fig. 6 shows a different mosaic or tesseræ tile C' in which the substituted units of design are not arranged in checkered formation but in an artistic design, and each consisting for example of a plurality of colors $c^6$, $c^7$ and $c^8$. The possibilities are endless.

Certain reference to apparatus has been herein made but it is not intended to make claim to the same herein, and the same is intended to be made the subject of a separate application for patent.

It will thus be seen that products and methods, have been described, embodying the principles and attaining the objects of the present invention. Since many matters of method, procedure, operation, combination, arrangement, design and detail may be variously modified without departing from the principles involved, it is not intended to limit the invention to such matters except so far as specified in the appended claims.

What is claimed is:

1. Method of producing cement tiles, slabs, etc., comprising preparing a thin mortar from a mixture of finely pulverized cement and rock material by adding water until semifluid, pouring into a mold having a polished bottom surface, then applying a layer of water absorbing cement mixture, then applying reinforcing mesh upon the mortar surface, then applying further water absorbing cement mixture upon the reinforcing mesh, then applying back pressure, and allowing the product to set and harden.

2. Method of producing cement tiles, slabs, etc., comprising preparing a thin mortar from a mixture of finely pulverized cement and rock material by adding water until semifluid, pouring into a mold having a polished bottom surface, applying a layer of water absorbing cement mixture, cutting to shape by blades pressed down substantially into contact with the bottom plate, sliding the mortar edgewise from the polished mold bottom upon a support, allowing it to set for a number of hours, and steam hardening it.

3. Method of producing cement tiles, slabs, etc., comprising preparing a thin mortar from a mixture of finely pulverized cement and rock material by adding water until semifluid, pouring into a mold having a polished bottom surface, applying a layer of water absorbing cement mixture, cutting to shape by blades pressed down substantially into contact with the bottom plate, allowing the mortar to set and harden, drying it under heat, and water proofing it in melted paraffin.

4. Method of producing cement tiles, slabs, etc., comprising preparing semi-liquid mortar by adding water to a finely pulverized and sifted cement mixture, pouring such mortar into a mold having a polished bottom surface, applying upon the mortar a layer of water absorbing antidote containing cement, to take up excess moisture, applying rear pressure to compact the mortar, sliding it edgewise from the polished mold bottom upon a non-adhering support, and allowing to set and harden.

5. Method as in claim 4 and wherein separate reinforcing meshes are placed upon each tile before the addition of backing cement.

6. Method of producing cement tiles, slabs, etc., comprising preparing semi-liquid mortar by adding water to a finely pulverized and sifted mixture of cement and rock material, pouring such mortar into a mold having a polished bottom surface, applying a layer of water absorbing antidote containing cement, to take up excess moisture, applying rear pressure to compact the mortar, allowing it to set, heating it to expel moisture, applying hot melted paraffin to the surface while hot, and maintaining the paraffin treatment while allowing the tile to cool, to impregnate the surface with paraffin.

7. Method of producing cement tiles, slabs, etc., comprising preparing semi-liquid mortar by adding water to a finely pulverized and sifted cement mixture, pouring such mortar into a mold having a polished bottom surface, applying water absorbing antidote containing cement, to take up excess moisture, and allowing the mortar to set, and surface treating the product while moist with an agent capable of filling the pores in colloidal condition, and removing the excess material by cold washing.

8. Method of producing cement tiles, slabs, etc., comprising preparing semi-liquid mortar, by adding water to a finely pulverized cement mixture, pouring a layer of such mortar into a mold having a glass bottom, scraping away portions of such layer in irregular designs or streaks to the full depth of the layer, inspecting the effect of such scraping operation by illumination and viewing through the glass bottom, depositing a mortar of different color in said scraped parts, applying a layer of water absorbing antidote containing cement, to take up excess moisture, and allowing the mortar to set.

9. Method of producing cement tiles, slabs, etc., comprising preparing semi-liquid mortar by adding water to a finely pulverized cement mixture, pouring such mortar into a mold having a polished bottom surface, and forming a design of depressions reaching to the bottom of such layer, depositing a different color mortar in such depressions, softening and blending the outlines by mechanical jogging of the mold, applying a layer of water absorbing antidote containing cement, to take up excess moisture, and allowing the mortar to set.

10. Method of producing cement tiles, slabs, etc., comprising preparing a thin mortar from a mixture of finely pulverized cement and rock material by adding water until semi-fluid, pouring into a mold having a polished plate glass bottom surface, scratching or scraping the mortar to its full depth while under illumination and inspection through the glass bottom, filling in the depressions with material of another color, and applying backing material.

11. Method of producing cement tiles, slabs, etc., comprising preparing a thin mortar from a mixture of finely pulverized cement and rock material, pouring into a mold having a polished bottom surface, applying a layer of water absorbing cement mixture, allowing it to thicken, subdividing the mortar into small mosaic elements by a patterned grid pressed through the mortar, ejecting some but not all of the elements upon a support, and completing the pattern by depositing mortar of different color between the ejected elements, while maintaining face grooves separating the elements.

12. Method of producing cement tiles, slabs, etc., comprising preparing a mortar from a finely pulverized cement mixture, forming the same into a layer, forming a similar layer of a cement mortar of different color, cutting the first mortar into small elements of design by a mosaic grid pressed through the mortar, and cutting the second mortar by a grid having similar design, ejecting upon a support some but not all of the elements of the first mortar, and ejecting into the spaces therebetween other elements of the second mortar, while maintaining face grooves separating the elements, applying a cementitious backing and allowing the product to set.

13. Method as in claim 12 and wherein elements of the first mortar not deposited on the first support are ejected on a second support, and spaces therebetween supplied with elements of the first mortar.

14. Method as in claim 12 and wherein before the cementitious backing is applied an antidote layer is applied to take up excess moisture, and after allowing to thicken, the mosaic mortar is separated into tiles by a grid of the full depth of the complete tile, a rigid reinforcing mesh is inserted upon each tile, and the backing applied behind such mesh.

15. Method of producing cement tiles, slabs, etc., comprising preparing semi-liquid mortar by adding water to a finely pulverized cement mixture, pouring such mortar into a mold having a polished bottom surface, and forming it with depressions extending through to the bottom, depositing in such depressions mortar of another color, applying a layer of water absorbing antidote containing cement, to take up excess moisture, allowing the mortar to thicken, cutting it into small mosaic elements, maintaining some but not all of such elements upon a support, completing the pattern with preformed elements of a different mortar, applying a backing of cementitious material, and allowing the product to set and harden.

16. Method of producing cement tiles, slabs, etc., comprising preparing semi-liquid mortar by adding water to a finely pulverized cement mixture, depositing such mortar into a mold having a flat bottom surface, and forming it with irregular voids extending through to the bottom, depositing in such voids mortar of another color, applying a layer of water absorbing antidote containing cement, to take up excess moisture, cutting the mortar into small mosaic elements, maintaining some but not all of such elements upon a support, completing the pattern with preformed elements of a different mortar, applying a rigid reinforcing mesh, applying a backing of cementitious material, and allowing the product to set and harden.

In testimony whereof I have affixed my signature hereto.

JOHN MEIGGS EWEN.